United States Patent Office 3,615,040
Patented Oct. 26, 1971

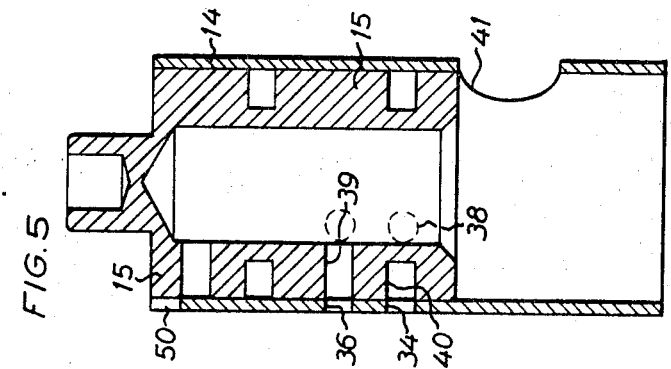
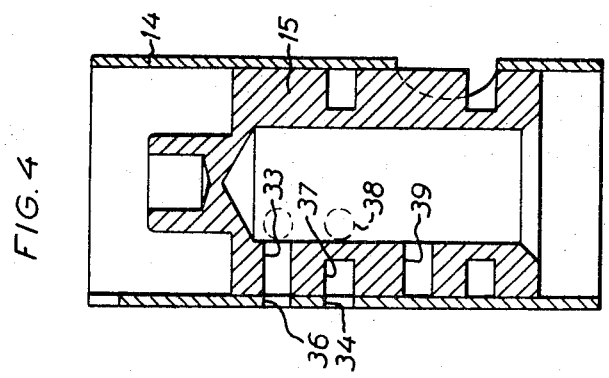
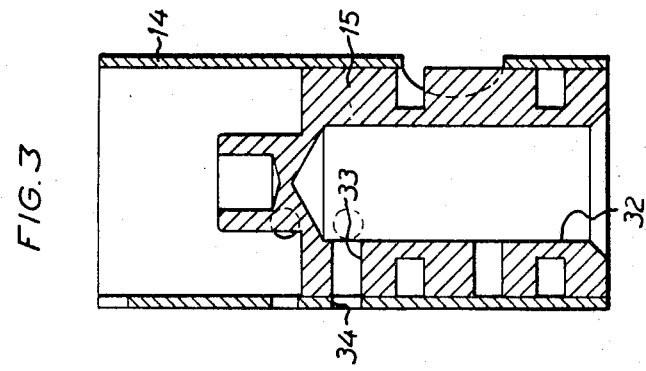

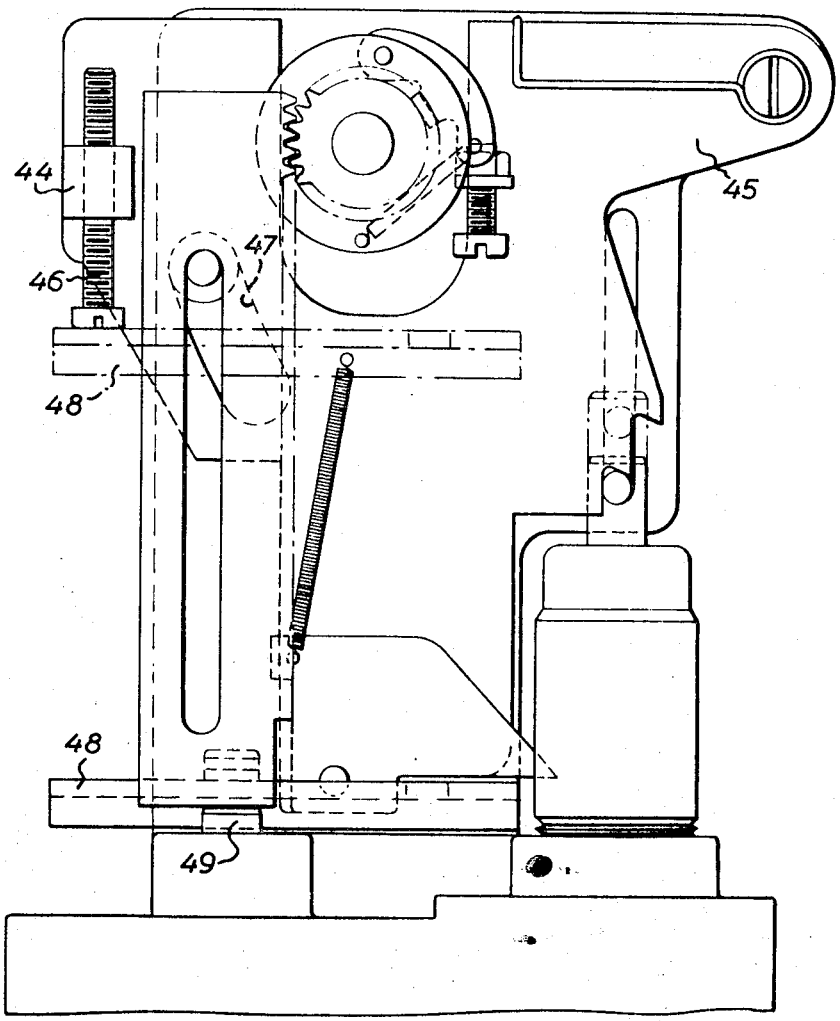

3,615,040
APPARATUS FOR AUTOMATICALLY ZEROIZING COUNTERS ASSOCIATED WITH FLUID DISPENSING UNITS
Hans Erik Eklund and Leif Gunnar Persson, Malmo, Sweden, assignors to Aktiebolaget Ljungmans Verkstader, Malmo, Sweden
Filed June 4, 1969, Ser. No. 830,377
Claims priority, application Sweden, June 10, 1968, 7,759/68
Int. Cl. B67d 5/26
U.S. Cl. 222—33                    7 Claims

ABSTRACT OF THE DISCLOSURE

An apparatus for zeroizing counters in fluid dispensing units, in which a slide valve is connected directly in the main fluid flow conduit and is actuable by the fluid pressure in said conduit for operating a zeroizing mechanism in such a way that said conduit is kept closed until the counters are zeroized, whereby all manual adjustments hitherto necessary are eliminated.

---

This invention relates to an apparatus for automatically zeroizing counters associated with fluid dispensing units and driven by an appliance metering the dispensed quantity of fluid, each of the counters having a zeroizing mechanism which for zeroizing its counter is operable at each dispensing cycle by means of a piston in a cylinder which is connectible to a fluid flow conduit, extending from a reservoir to an outlet via the metering appliance, by means of a control valve interposed in said fluid flow conduit and in its initial position keeping said conduit closed.

The counters associated with fluid dispensing units and adapted to indicate the quantity of dispensed fluid which is determined by means of a suitable metering appliance, usually a throughflow meter, have to be zeroized before each new dispensing cycle. A previously known zeroizing mechanism is so designed that it has to be adjusted manually before a zeroizing operation and thus before the start of a dispensing cycle. This adjustment is effected when the dispensing means, for instance a dispensing nozzle or hose nozzle, is unhooked from its support and a starting member (as a rule placed directly beneath said nozzle support) is adjusted for initiation of the pump motor of the dispensing unit. After said adjustment the zeroizing mechanism can effect zeroizing of the counter under the action of the pressure on the fluid supplied by means of the pump, whereupon a fluid flow conduit is opened, which extends from the pump to the zeroizing mechanism and from said mechanism to the hose nozzle via the throughflow meter driving the counter. The principal drawback of this zeroizing mechanism is that it has to be manually adjusted before zeroizing can be effected. In many cases this drawback will have an impeding effect on the self-service activity at dispensing units of various kinds.

The present invention eliminates this drawback and to this end is characterized in that the fluid flow conduit in the initial position of the control valve is connected to one end of the cylinder, whereby the piston is moved correspondingly to the pressure on the fluid to be dispensed and thus provides zeroizing of the counter, and the control valve has associated with it a ratchet mechanism which is adapted during the zeroizing movement of the piston to prevent the control valve from opening the fluid flow conduit which is closed by said valve.

Figure 1:
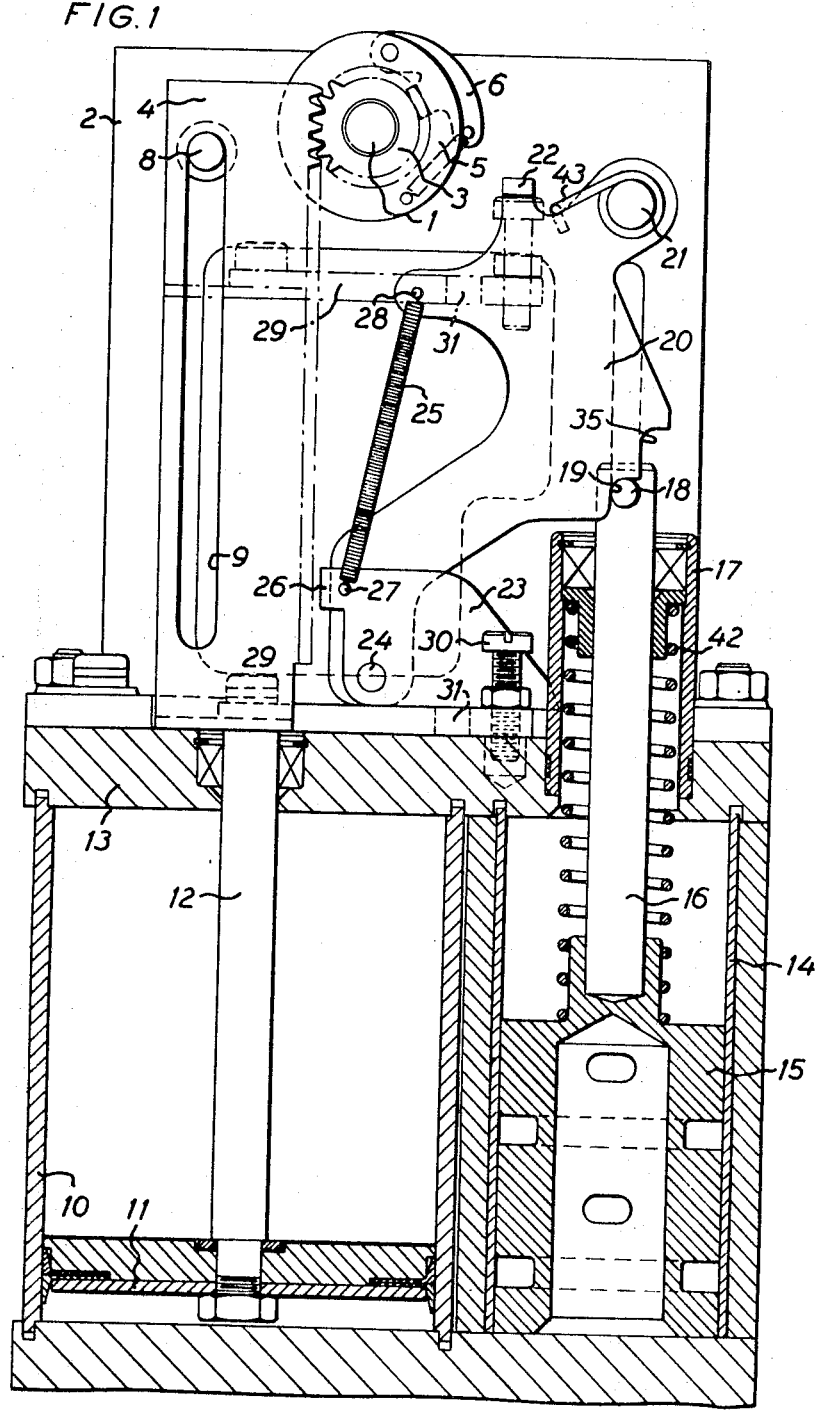
Figure 2:
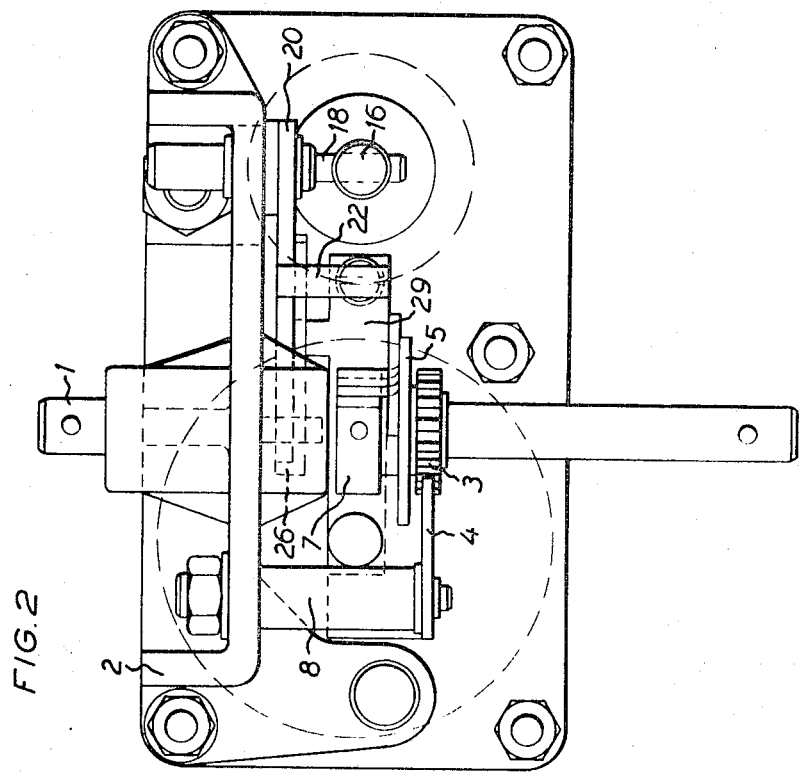

The invention will be more fully described with reference to the accompanying drawings in which:

FIG. 1 is a diagrammatic elevation, partly in section, of a preferred embodiment of the apparatus according to the invention;
FIG. 2 is a top plan view of the apparatus shown in FIG. 1;
FIGS. 3–5 are sections of a control valve in different positions;
FIG. 6 is an elevation of another embodiment of the apparatus.

The apparatus shown in FIGS. 1 and 2 is intended for a counter which is driven by a conventional fluid metering appliance and which has a zeroizing mechanism actuated by means of a shaft 1. The fluid metering appliance may be a throughflow meter which is interposed in a fluid flow conduit extending from a reservoir to a dispensing point, for instance a hose nozzle, via a control valve for the zeroizing mechanism and the throughflow meter. The shaft 1 is mounted for rotation in a frame 2 and is rotatable by means of a rack 4 via a gear 3 which is rotatable on the shaft 1 and meshes with the rack 4. The gear 3 is connected to a ratchet wheel 5 which is rotatable on the shaft 1 and carries a spring-loaded pawl 6. Said pawl 6 is engaged in a recess in a dog plate 7 fixedly connected to the shaft 1 for positive unidirectional rotation of said shaft. This direction is the clockwise direction in FIG. 1, and rotation is realized when the rack 4 is shifted. The rack 4 is guided on a guide pin 8 secured to the frame 2, and at its upward and downward shifting movement the rack 4 will be guided by the pin 8 via a guide groove 9 provided in the rack. The zeroizing mechanism connected to the shaft 1 will thus bring about zeroizing of the associated counter when the rack 4 is shifted from the FIG. 1 position to the position in which the guide pin is at the opposite end of the guide groove 9.

Shifting of the rack is realized by means of a piston 11 which is movable in a cylinder 10. Secured to the piston is a piston rod 12 which projects through one end wall 13 of the cylinder 10 and is connected to the rack 4 at the lower end thereof. Movement of the piston 11 in the cylinder 10 is effected by means of the fluid to be dispensed. The fluid is supplied to the cylinder 10 via the control valve which consists of a spool-type slide 15, movable in a housing 14. This control valve is shown more in detail in FIGS. 3–5 and will be more fully described later on. The slide 15 is fixedly connected to a slide rod 16 which penetrates one end wall 17 of the housing 14 and carries a ratchet pin 18 at its outer end. Said pin 18 is engaged in a notch 19 in a ratchet plate 20.

The ratchet plate 20 is pivotally mounted on a pivot pin 21 secured to the frame 2. Moreover, the ratchet plate 20 has an upper fixed abutment 22 and a lower abutment 23 which can be swung in one direction. The lower abutment 23 is pivotally mounted on the ratchet plate 20 by means of a pin 24 and is spring-loaded towards its initial position by means of a spring 25. In the initial position of the lower abutment 23 a bent portion 26 is in engagement with the ratchet plate 20 and prevents the lower abutment 23 from swinging clockwise. The spring 25 extends from a pin 27 on the lower abutment 23 to a pin 28 on the ratchet plate 20. The lower abutment will thus be pressed against the ratchet plate 20 so that the bent portion 26 will be engaged with said plate. Mounted on the end of the piston rod 12 outside the cylinder 10 is an abutment means 29 which at the end remote from the piston rod carries a set screw 30 which is adapted to engage the abutment 22 of the ratchet plate 20. The abutment means 29 also has a projection 31 which is adapted to actuate the lower abutment 23 of the ratchet plate 20. As will appear from FIG. 1, the projection 31, when the piston rod is moved towards one end 13 of the cylinder 10, will swing the lower abutment 23 counterclockwise, whereupon the abutment 23 is returned to the FIG. 1 position by the action of the spring 25. At this pivotment of the abutment 23 the ratchet plate 20 will not be actuated but remain in the FIG. 1 position to which the ratchet plate is urged by means of a spring 43 which is coiled on the pivot pin 21 and one end of which is anchored to the pin while the other end of the spring is bent about the ratchet plate in the manner shown in FIG. 1.

The housing 14 of the control valve has an inlet socket (not shown) for the fluid flow conduit in the dispensing unit. Said conduit extends from a reservoir via a pump device to the inlet socket of the housing 14, which is located at the lower end of the housing. At a certain pressure of the fluid in the fluid flow conduit the fluid will flow from the reservoir to the inlet of the housing 14 and into the central bore 32 in the spool-type slide 15. From the bore 32 the fluid flows through an aperture 33 in the slide wall. In the position of the slide 15 shown in FIG. 3 the aperture 33 is in communication with an aperture 34 in the housing 14. This aperture 34 is in communication via a passage with the cylinder 10 at the lower side of the piston 11 (FIG. 1). With the slide 15 in its initial position which corresponds to the position in FIG. 3 and from which it cannot be moved because the ratchet pin 18 is engaged in the notch 19 of the ratchet plate 20, the fluid can thus flow via apertures 33 and 34 and said passage to the cylinder 10 and cause the piston to move upwards towards the end wall 13 of the cylinder. During this movement of the piston 11 the counter, as already mentioned, will be zeroized via the rack 4. When the piston has reached its upper position in the cylinder at the end wall 13 the head of the set screw 30 will get in contact with the abutment 22 of the ratchet plate 20, thereby pivoting said plate. At the pivotment of the ratchet plate 20, which shall only be so large that the ratchet pin 18 on the slide rod 16 is disengaged from the notch 19 in the ratchet plate 20, the ratchet pin 18 because of the fluid pressure exerted on the slide 15 is moved to the notch 35 in the ratchet plate 20. When the slide 15 has been moved to the position which is determined by the ratchet pin 18 and the notch 35 and is illustrated more in detail in FIG. 4, the aperture 33 in the slide 15 will communicate with an aperture 36 in the housing 14 and the aperture 34 in the housing 14 will communicate with a return passage 37 in the slide 15. Via a return aperture 38 and a return passage-way the return passage 37 is in communication with a return conduit which extends back to the reservoir. The aperture 36 leads to a passage which runs to the upper end of the cylinder 10. The piston will thus be moved downwards because of the fluid flowing to the upper end of the cylinder 10, since the fluid at the underside of the piston can escape into the return conduit via the aperture 34, the return passage 37 and the return aperture 38. During the movement of the piston 11 to the lower end of the cylinder 10 the projection 31 on the abutment means 29 will engage the lower swingable abutment 23 of the ratchet plate 20, whereby said plate 20 pivots clockwise until the projection 31 has gone past the apex of the lower abutment 23. During the pivotment of the ratchet plate 20 the ratchet pin 18 will be disengaged from the notch 35, and thus the slide 15 can be moved upwards to the position shown in FIG. 5. The fluid that may be present on the upper side of the slide 15 can escape from the housing 14 via an aperture 50 at the upper end of the housing. The aperture 50 leads via a passageway to the return conduit. In this position the upper end of the cylinder is in communication with the fluid flow conduit via an aperture 39 in the slide 15 and the aperture 36 in the housing 14, and the lower end of the cylinder 10 is in communication with the return conduit via the aperture 34, a return passage 40 and the return aperture 38. In this position of the slide 15 there is also uncovered an outlet 41 from the housing 14, which is in communication with that part of the fluid flow conduit which extends from the control valve to the metering appliance and from said appliance to the dispensing point. Thus the fluid will flow from the reservoir to the dispensing point via the metering appliance as long as the fluid is under the pressure required to maintain the slide 15 in the FIG. 5 position against the action of a spring 42. The spring 42 urges the slide towards the position shown in FIG. 3. When the pressure on the fluid in the fluid flow conduit diminishes the slide 15 will revert to the position shown in FIG. 3. At a renewed increase of the pressure on the fluid the zeroizing operation described above will be repeated.

FIG. 6 diagrammatically illustrates another embodiment of the apparatus described in the foregoing, the main difference between the first and the second embodiment being that the ratchet plate is of another design. In FIG. 6 the upper fixed abutment 44 of the ratchet plate 45 is provided with a set screw 46. Moreover, the ratchet plate 45 has a guide groove 47 which serves to guide the movement of the ratchet plate 45 with respect to the same guide pin which serves to guide the rack 4. The abutment means 48 of the piston rod 49 extends both to the left and to the right in this second embodiment. Obviously, the function or mode of operation of the embodiment shown in FIG. 6 will coincide with the function or mode of operation of the apparatus illustrated in FIG. 1.

The apparatus described in the foregoing for zeroizing the counter associated with a dispensing unit is particularly applicable to self-service installations in which the dispensing point, for instance a hose nozzle, can be hooked up in an operating cabinet which is placed at a suitable location for dispensing fluid from the installation to a vehicle of some kind. As a rule, the operating cabinet is provided with a recess for the hose nozzle and a switch actuable by said nozzle and adapted to interrupt the circuit of the pump motor when the hose nozzle is placed in the recess and to close the circuit of the pump motor when the hose nozzle is removed from the recess in the operating cabinet. Furthermore, the operating cabinet is provided with push button switches for choice of indication. This permits causing the numeral indicator of the hose nozzle to indicate the fluid quantity dispensed in either $ or gallons. The operating cabinet can also have a set of push buttons for preselecting the quantity of fluid to be dispensed.

When the hose nozzle is unhooked from its recess in the operating cabinet, the circuit of the pump motor is closed, whereby the pressure on the fluid is increased and said fluid flows from the reservoir to the control valve in the zeroizing mechanism and from said mechanism to the cylinder 10. The piston 11 will thus be moved towards the upper end 13 of the cylinder 10 and during this movement the counter is zeroized because of the rotation of the shaft realized by the rack 4. When the piston 11 has reached its upper position the ratchet plate 20 has been swung owing to the engagement between the set screw 30 and the abutment 22. The ratchet pin 18 is thus disengaged from the pawl 19 and the slide 15 in the control valve is moved to its second position in which the fluid in the fluid flow conduit returns the piston 11 to its original position, whereby the projection 31 of the abutment means 29 will strike the lower abutment 23 of the ratchet plate 20 sliding along the upper surface of said abutment while the ratchet plate 20 is pivoted clockwise, as is shown in the drawing. As a result of this pivotment of the ratchet plate 20 the ratchet pin 18 is disengaged from the notch 35 in the ratchet plate 20, whereby the slide 15 is moved to its third position in which the fluid flow conduit is opened and the fluid is allowed to flow through said conduit to the throughflow meter and from said meter to the hose nozzle. At finished dispensing operation the hose nozzle is hooked up in the operating cabinet, whereby the circuit of the pump motor is interrupted and the pressure in the fluid flow conduit diminishes. Owing to this pressure reduction the spring 32 will return the slide to its initial position, whereupon a further zeroizing procedure is required before a new dispensing operation can be initiated.

As will be readily understood, the only manual operation required is to remove the hose nozzle from its recess in the operating cabinet for bringing about the zeroizing procedure according to the present invention.

While two embodiments of the present invention have been described above and shown in the drawings those skilled in the art will realize that many modifications can be resorted to within the scope of the appended claims.

What we claim and desire to secure by Letters Patent is:

1. An apparatus for automatically zeroizing counters associated with fluid dispensing units and driven by an appliance metering the dispensed quantity of fluid, each of the counters having a zeroizing mechanism which for zeroizing its counter is operable at each dispensing cycle by means of a piston in a cylinder which is connectible to a fluid flow conduit, which extends from a reservoir to an outlet via the metering appliance, by means of a control valve interposed in said fluid flow conduit and in its initial position keeping said conduit closed, in the initial position of the control valve the fluid flow conduit being connected to one end of the cylinder, whereby the piston is moved corresponding to the pressure on the fluid to be dispensed and thus provides zeroizing of the counter, and the control valve has associated with it a ratchet mechanism which is adapted during the zeroizing movement of the piston to prevent the control valve from opening the fluid flow conduit which is closed by said valve.

2. An apparatus as claimed in claim 1, wherein at the end of the zeroizing procedure the piston of the cylinder is adapted to so actuate the ratchet mechanism that the control valve which is spring-loaded towards its initial position is released for being moved to a position in which the movement of the piston is reversed.

3. An apparatus as claimed in claim 1, wherein in the initial position of the control valve one end of the cylinder is connected to the fluid flow conduit at which end the piston has its normal position, and a return conduit is connected to the other end of the cylinder, whereby the piston is moved to the other end of the cylinder at a predetermined pressure on the fluid in the fluid flow conduit leading from the reservoir, and the piston is adapted, in its position at the other end of the cylinder, to so actuate the ratchet mechanism that the control valve is released for being actuated by the fluid pressure to a second position in which the other end of the cylinder is connected to the fluid flow conduit and the one end of the cylinder is connected to the return conduit, whereby the piston is moved to the one end of the cylinder and thus to its normal position causing the ratchet mechanism during this movement to release the control valve for being actuated by the fluid pressure to a third position in which the fluid flow conduit is opened and fluid flows to the outlet via the metering appliance.

4. An apparatus as claimed in claim 3, wherein the control valve consists of a slide guided in a housing which has two connections for the fluid flow conduit, an outlet and an inlet, and a connection for the return conduit as well as two first passages which are each in communication with one end of the cylinder, and two second passages which lead to the connection for the return conduit, and the slide has a central bore which extends some distance into the slide from the end surface facing the inlet, and from said bore there extend two apertures which shall communicate with the first two passages in the housing, the slide also having two passages one of which communicates with one of the first passages and one of the second passages in one position of the slide while the second passage communicates with the other one of the first passages and the other one of the second passages in another position of the slide.

5. An apparatus as claimed in claim 4, wherein the slide is fixedly connected to a rod which projects from the housing and serves to engage the ratchet mechanism, and a piston rod fixedly mounted in the piston carries a rack for actuation of the zeroiizng mechanism and two abutments, one of which is adapted, when the piston is at the other end of the cylinder, to actuate the ratchet mechanism for disengagement of the rod, whereupon the slide is moved for a new engagement between the rod and the ratchet mechanism, while the other abutment is adapted, during the return of the piston to its normal position, to actuate the ratchet mechanism for a further disengagement of the rod, whereupon the slide is moved so as to open the fluid flow conduit.

6. An apparatus as claimed in claim 5, wherein the ratchet mechanism is a pivotally mounted plate which is spring-loaded towards an initial position and has at least two notches one of which is engaged by the rod serving for engagement with the ratchet mechanism in the initial position of the slide and the plate, while the other notch is moved into the path of motion of said rod when the latter is disengaged from said one notch when the plate is swung by engagement between abutments on the piston rod and the respective one of two abutments provided on the plate.

7. An apparatus as claimed in claim 6, wherein one abutment provided on the ratchet plate is a fixed abutment while the other abutment can be swung in one direction from an initial position towards which said other abutment is spring-loaded.

References Cited
FOREIGN PATENTS

| | | | |
|---|---|---|---|
| 165,403 | 11/1958 | Sweden | 222—33 |
| 1,136,858 | 9/1962 | Germany | 222—32 |

ROBERT B. REEVES, Primary Examiner

J. P. SHANNON, Assistant Examiner